Figure 1:
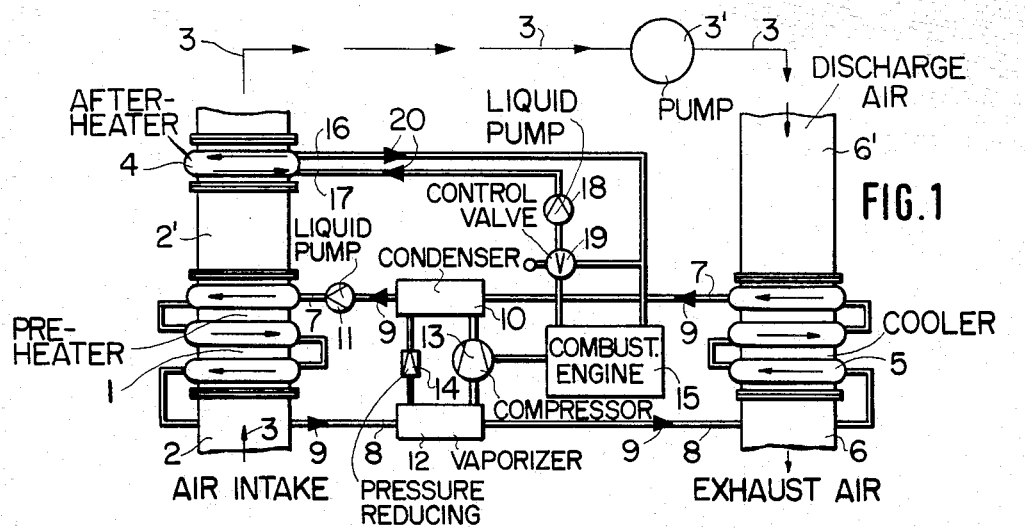

United States Patent [19]

Richarts

[11] Patent Number: 4,510,762
[45] Date of Patent: Apr. 16, 1985

[54] HEAT RECOVERY METHOD

[75] Inventor: Fritz Richarts, Stolberg-Breinig, Fed. Rep. of Germany

[73] Assignee: H. Krantz GmbH & Co., Aachen, Fed. Rep. of Germany

[21] Appl. No.: 593,106

[22] Filed: Mar. 26, 1984

[30] Foreign Application Priority Data

Jun. 15, 1982 [DE] Fed. Rep. of Germany ....... 3222406

[51] Int. Cl.³ ............................................. F25B 7/00
[52] U.S. Cl. ......................................... 62/79; 62/159; 62/238.6; 62/325
[58] Field of Search ................ 62/325, 79, 238.6, 115, 62/118, 159

[56] References Cited

U.S. PATENT DOCUMENTS

| 2,797,068 | 6/1957 | McFarlan | 62/159 X |
| 3,127,929 | 4/1964 | Ringquist | 62/159 X |
| 3,378,062 | 4/1968 | Ringquist et al. | 62/159 X |
| 3,850,007 | 11/1974 | McFarlan | 62/159 X |
| 4,010,624 | 3/1977 | McFarlan | 62/159 |
| 4,363,218 | 12/1982 | Nussbaum | 62/238.6 X |
| 4,413,478 | 11/1983 | McFarlan | 62/325 X |

FOREIGN PATENT DOCUMENTS 2922179 12/1980 Fed. Rep. of Germany .

OTHER PUBLICATIONS

VDI-Richtlinie 2071, Dec. 1981; of the VDI-Handbuch Lueftungstechnik, pp. 1 to 8, "Heat Recovery, Definitions and Technical Descriptions".
VDI-Richtlinien 2071, Mar. 1983; of the VDI-Handbuch Lueftungstechnik, pp. 2 to 43, "Heat Recovery Economy Calculation".

Primary Examiner—Lloyd L. King
Attorney, Agent, or Firm—W. G. Fasse; D. H. Kane, Jr.

[57] ABSTRACT

Heat is recovered by combining a heat transfer system including heat exchangers interconnected in a circulatory system, with a heat pump system. The heat pump system is preferably operated in accordance with the Lorenz-Principle. It is not necessary to divide the heat carrier circuit of the heat pump into two or three separate circulatory circuits. The heat carrier circuit of the heat pump can thus continue to operate unchanged even if the heat pump is switched off. For this purpose the warm heat carrier coming from a discharge fluid cooler, is heated further in a condenser of the heat pump and the cold heat carrier coming from a preheater or cooler group, is cooled further in an evaporator of the heat pump.

6 Claims, 3 Drawing Figures

HEAT RECOVERY METHOD

FIELD OF THE INVENTION

An improved heat recovery method recovers heat from a fluid medium, such as air passing through different temperature stages. The heat recovery is aided by a heat carrier circulatory system, wherein the entrance temperatures of a heat carrier into a preheater or into a cooler group are changed by means of a heat pumping process.

DESCRIPTION OF THE PRIOR ART

A method of the type described above is known from German Patent Publication (DE-OS) 2,922,179 combining a heat recovery system including heat exchangers interconnected in a circulatory flow circuit and a heat pump system. The prior art method is performed by a device for tempering the drying air of a shelf dryer, whereby the tempering device comprises a main air heater connected to the air supply inlet of the dryer proper so that the main air heater is arranged upstream of said air inlet as viewed in the air flow direction. The drying device further comprises two recuperative pipe assemblies forming two heat exchanger units which are connectable to a closed pipe system including a circulating pump. A liquid heat carrier may be introduced into the heat exchanger units through the pipe system in a circulatory flow path. The first heat exchanger unit is operatively arranged downstream of the discharging air outlet of the dryer proper as viewed in the air flow direction. The first heat exchanger unit is further constructed as an air cooler so that the discharge air may flow over the outer surfaces of the air cooler. The second heat exchanger unit is constructed as a preheater for the inlet air so that the inlet air may flow over the outer surfaces of the air preheater. Further, the second heat exchanger unit is operatively arranged upstream of the dryer proper and upstream of the main air heater as viewed in the air flow direction. Thus, it is possible to transfer the heat taken out of the discharge air by the heat carrier in the zone of the first heat exchanger unit to the inflowing fresh air in the zone of the second heat exchanger unit. For further reducing the energy needed for performing the drying operation, it is suggested in the German Patent Publication (DE-OS) 2,922,179 that the system for the indirect heat recovery is arranged for cooperation, not only with a closed pipe system including a circulating pump, but also with a heat pump circulatory circuit including an evaporator, a compressor, a condenser unit, and a pressure reduction valve all interconnected by five conduits. Thus, it becomes possible for the heat carrier flowing through the pipe conduits of the heat pump circulatory circuit to recover heat from the outflowing discharge air and to transfer this recovered heat to the inflowing fresh air by means of the heat carrier flowing through the pipe conduits of the heat pump circuit, whereby this recovered heat may be elevated to a higher energy level by the compressor.

This known heat recovery system requires always heat transfer groups constructed in two stages. Accordingly, different operational modes are possible in which the heat pump, if it is operated, always transfers the entire heat, which is recovered through the heat pump, by means of the cryogen circulatory circuit. In such an instance it is necessary to divide the liquid flow circuit with the aid of switch-over valves which separate the discharge air cooler from the direct connection to the fresh air preheater and which directly connect the discharge air cooler with the evaporator of the heat pump. In the same manner it is possible to separately connect the fresh air preheater with the condenser of the heat pump by a switch-over of the valves. Accordingly, it is necessary that the entire liquid circulatory flow circuit is divided into two or three separate circuits if the heat pump is switched on.

OBJECTS OF THE INVENTION

In view of the above it is the aim of the invention to achieve the following objects singly or in combination:
- to provide a heat recovery method which is always operable with a closed circulatory circuit, thereby obviating any valve switch-overs or switching off valves;
- to provide a heat recovery method which is operable selectively either with or without the heat pump, whereby the system may remain unchanged when the heat pump is switched off;
- to minimize any modifications that may be required to be made in the system components such as the regenerators;
- to provide a heat recovery system which may be operated conventionally without a heat pump under low load conditions and which may be operated as taught herein under heavy load conditions; and
- to provide a heat recovery having substantially improved performance figures as compared to prior art systems.

SUMMARY OF THE INVENTION

According to the invention a heat carrier medium which has been heated by the discharge air cooler is further heated in the condenser of a heat pump and the heat carrier medium which has been cooled by the preheater or in a cooler group is further cooled in the vaporizer of the heat pump. In the system according to the invention the liquid heat carrier medium circulating in the pipe conduit system of the regenerator flows from the discharge air cooler through the condenser of the heat pump to the fresh air preheater and from the latter through the vaporizer of the heat pump back to the discharge air cooler in a closed circulatory circuit. Since it is thus possible to always maintain a closed circuit, expensive switch-over or switch off valves have been obviated. If the heat pump is switched off, the heat recovery is performed within the unchanged system in accordance with a known method. Such a system is referred to as a "regenerator comprising separation surfaces, (Category II)" in the VDI-Guideline 2071. However, as long as the system works conventionally, only relatively small heat recovery values are attainable. Contrary thereto, when the system operates as taught herein in combination with a heat pumping system, the present method or system offers conceptual as well as structural advantages which are seen in that the circuit arrangement of the system is simple and its installation does not involve any system technological problems since it does not require any switch-over or control components. The heat recovering means may be operated conventionally without a heat pump when the load is low. Conventional heat recovery means which are operated as regenerators with separation surfaces (Category II) may be modified with a small investment for performing the method according to the invention. Compared to conventional heat recovery systems with heat pumps, it is possible, according to the invention, to achieve substantially more advantageous performance values or figures, for example, such figures are higher by about 50%.

BRIEF FIGURE DESCRIPTION

Figure 2:
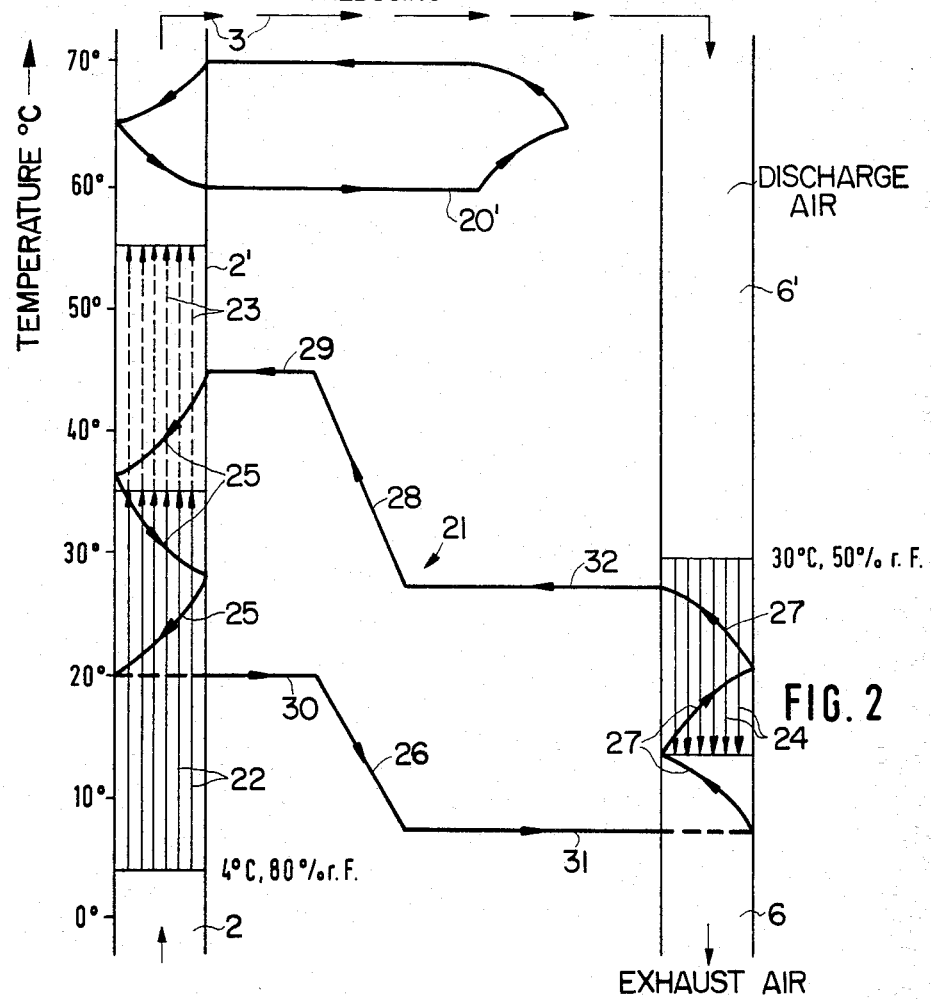
Figure 3:
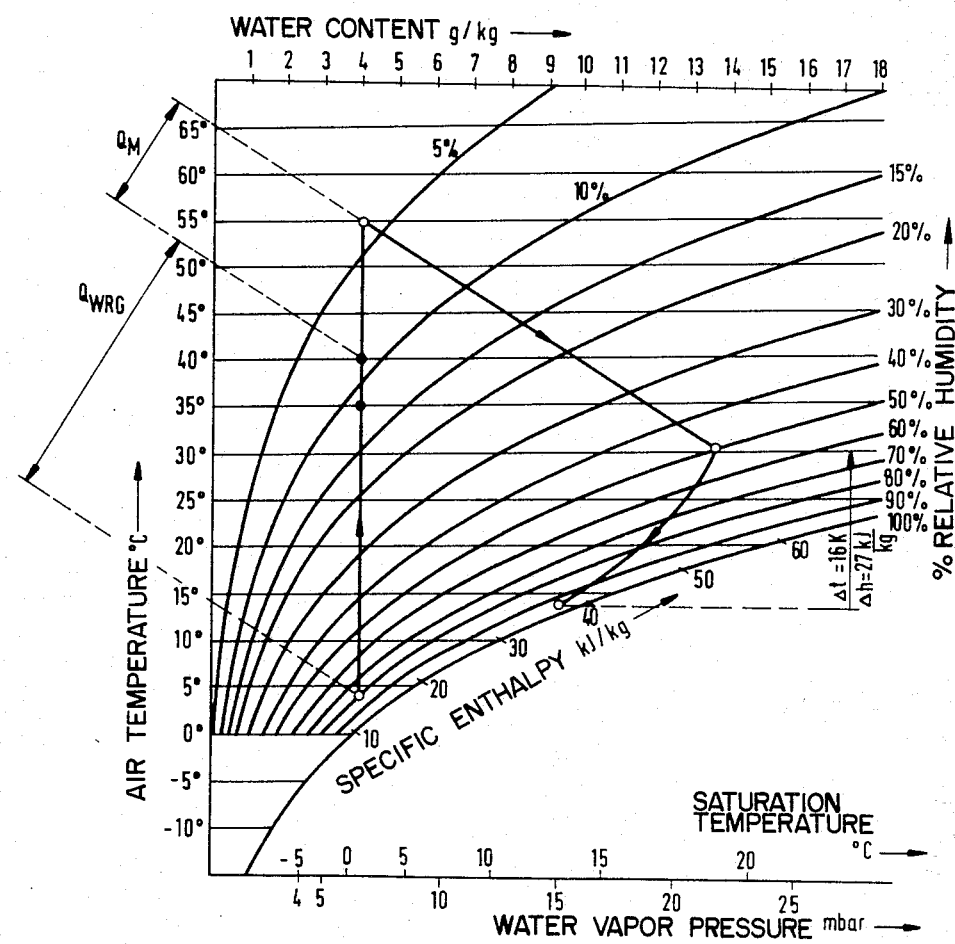

In order that the invention may be clearly understood, it will now be described, by way of example, with reference to the accompanying drawings, wherein:

FIG. 1 is a block diagram of a system suitable for performing the present method;

FIG. 2 illustrates in its upper portion the temperature schedule of an afterheater mass flow, in its lower portion FIG. 2 shows the temperature schedule of a primary mass flow in the respective system components shown in FIG. 1, FIG. 2 also shows the temperature rise in the air intake and the temperature drop in the cooler of FIG. 1; and FIG. 3 shows in a Mollier-Phase-Diagram the temperature changes, the humidity changes, and the enthalpie changes of the intake air and the discharge air in the system of FIG. 1 as a function of the saturation temperature and as a function of the water vapor pressure.

DETAILED DESCRIPTION OF PREFERRED EXAMPLE EMBODIMENTS AND OF THE BEST MODE OF THE INVENTION

The system of FIG. 1 comprises a preheater 1 for preheating the fresh external intake air entering into a duct system at a fresh air inlet port or air intake 2. Downstream of the preheater 1 as viewed in the direction of the air flow indicated by the arrows 3 in a respective duct system merely shown schematically there is arranged a reheater or afterheater 4. Downstream of the afterheater 4 there is arranged a cooling device or cooler 5 having an outlet port 6 for discharging the exhaust air. The fresh air inlet port or air intake 2 and the exhaust air outlet port 6 are interconnected by a duct system, only portions of which are shown at 2' and 6'.

In this context the air moving through the duct system 2', 6' is the fluid from which heat is to be recovered. This fluid is pumped through the duct system by a conveying means such as a pump or blower 3' not shown in detail since it is conventional. The present method is not limited to air as the fluid from which heat may be recovered.

The preheater 1 and the cooler 5, both of which are of conventional construction, are interconnected to form a closed circuit circulatory conduit system including pipes 7 and 8 in which the flow direction of a heat carrier, such as water forming a primary mass, is indicated by the arrows 9 representing the primary mass flow in a primary mass flow circuit. The heat carrier fluid return flow pipe conduit 7 from the cooling device 5 to the preheater 1 is connected through a condenser 10 arranged in series with a liquid pump 11 located downstream of the condenser 10 as viewed in the flow direction 9 of the primary mass flow circuit. A vaporizer 12 is connected in the flow pipe conduit 8.

A compression heat pump comprising a compressor 13, the condenser 10, an expansion or pressure reduction valve 14, and the vaporizer 12, is connected in the pipe conduits 7 and 8. The condenser 10 is connected in the return flow conduit 7. The vaporizer 12 is connected in the conduit 8. The compressor 13 of the heat pump is driven by a prime mover such as an internal combustion engine 15. The condenser 10 and the vaporizer 12 are interconnected by the compressor 13 and by the pressure reduction valve 14 as shown.

Heat produced by the internal combustion engine 15 is transported by a mass such as water flowing through pipes 16 and 17 to the reheater or afterheater 4, whereby a liquid pump 18 and a control valve 19 are arranged in the pipe 17 forming an afterheater mass flow circuit 20 for circulating the afterheater mass flow.

The operation of the system disclosed in FIG. 1 as taught by the invention will now be described with reference to FIG. 2 which shows the duct portion 2' with its fresh air inlet port 2 and the duct portion 6' with its exhaust air outlet port 6. The primary heat carrier or mass such as a liquid, for example water, flows in the primary mass flow circuit 9 forming a closed heat exchange circuit including the pipe conduits 7 and 8, the preheater 1, the cooler 5, the condenser 10, and the vaporizer 12.

The temperature schedule 20' shown at the top of FIG. 2 illustrates the temperature changes in the afterheater mass flow circuit 20 in FIG. 1 without the cooler 5. The temperature schedule 21 in the lower portion of FIG. 2 illustrates the temperature changes in the primary mass flow circuit 9 in FIG. 1 with the cooling device 5 included.

The full line arrows 22 in the lower left portion in FIG. 2 represent the temperature increase of the fresh air in the preheater 1. The dashed line arrows 23 in the middle of the duct portion 2' represent the temperature increase of the air in the afterheater 4. The full line arrows 24 in the lower end of the duct portion 6' represent the temperature drop of the discharge air in the cooler 5. Correspondingly, the sections 25 of the temperature schedule 21 of the primary mass flow show the temperature drop of the primary heat carrier mass flow in the preheater 1. The section 30 represents the outlet temperature of the primary mass flow as it exits from the preheater 1. The section 26 indicates the further temperature decrease of the primary mass flow in the vaporizer 12. The section 31 indicates the primary mass flow temperature at the inlet of the cooler 5. The sections 27 indicate the temperature increase of the primary mass flow in the cooler 5. The section 32 shows the temperature of the primary mass flow at the outlet of the cooler 5. The section 28 indicates the further temperature increase in the primary mass flow in the condenser 10. The section 29 connecting back to the sections 25 indicate the primary mass flow temperature at the inlet of the preheater 1.

Referring further to FIG. 2, in a preferred embodiment of the present method the entrance temperature of about 44° C. of the primary mass flow into the preheater 1 is shown at 29. The exit temperature of about 20° C. of the heat carrier medium out of the preheater 1 is shown at 30. The entrance temperature of the primary mass flow into the cooler 5 is shown at 31. The exit temperature of the primary mass flow from the cooler 5 is shown at 32.

The temperature schedule 21 of the primary mass flow circuit preferably satisfies the "Lorenz-Principle" which as such is known in connection with heat pumps and refrigeration. The Lorenz-Principle, compared to the Carnot-Process, has the advantage that in the Lorenz-Principle the phase change of the heat carrier or mass flow at the heat supply and at the heat withdrawal is not isothermal.

FIG. 3 shows the temperature changes of the mass flow from which heat is recovered in the system of FIG. 1 by the present method whereby the ordinate shows the temperature in °C. of the heat carrier mass and the abscissa has marked thereon the saturation temperature in °C. and the water vapor pressure in millibar. The percentage curves represent the relative humidity of the fluid, e.g. air from which heat is being recovered and the water content is indicated in grams of water per kilogram of fluid. The heat quantity $Q_{WRG}$ supplied to the preheater 1 by the compression heat pump and the heat quantity $Q_M$ supplied to the afterheater 4 from the internal combustion engine 15 are also shown for one specific operating condition in which the temperature of the fresh air is raised from about 4° C. to about 55° C. The temperature differences $\Delta t = 16°$ K. in the illustrated example represents the temperature drop of the fluid between the entrance and exit of the cooler 5. This temperature drop in the cooler 5 results in an additional heat recovery $\Delta h = 27$ kilojoule per kilogram of air cooled in the cooler 5.

According to a further embodiment of the invention, the quantity of the primary mass flow flowing in the closed heat pump circuit 9 is selected to satisfy an optimal ratio relative to the volume flow of the fluid flowing into and out of the duct system, for achieving an optimal heat recovery. It has been found that the quality or efficiency of the heat recovery depends substantially on the variability of the heat carrier or primary mass flow in the closed heat pump circuit 9. This dependency is shown in the following table:

| heat carrier or primary mass flow (kg/hour) | 60,000 | 70,000 | 80,000 | 90,000 | 110,000 | 150,000 |
|---|---|---|---|---|---|---|
| heat pump compressor power (kW) | 111 | 95 | 88 | 85 | 88 | 107 |
| Performance Figure Ratio of heating power to heat pump compressor power | 13.9 | 16.2 | 17.7 | 18.3 | 17.7 | 14.4 |

The above table shows that different heat pump compressor powers are needed if the mass flow of the heat carrier circulating in the circulatory system of the heat pump is changed. The optimal operational conditions are provided when the heat carrier mass flow is 90,000 kg per hour in an example in which 290,000 cubic meter of air per hour are to be heated from 2° C. to 18° C. in the preheater 1 and to be cooled from 24° C. to about 9° C. in the cooler 5. The further heating of the air from 18° C. to 24° C. is achieved in the afterheater 4. In this example the performance figure is optimal (18.3) when the primary mass flow of the heat carrier in the circuit 9 is 90,000 kg/hour.

The present system as shown in FIG. 1 may be originally constructed for this optimal value when the air volume per hour is taken as a constant value, e.g. 290,000 m³/hour. In the alternative, the mass flow may later be adjusted in accordance with operating conditions as they occur, depending on a varying air flow volume per hour requirement. The means for such heat carrier mass flow adjustments are conventional.

Incidentally, the heat recovered by the compression of the heat carrier may be applied to the fluid, from which heat is to be recovered, in a further heat exchanger, which is separate from the heat exchanger which applies the condensation heat of the heat carrier to the fluid.

Although the invention has been described with reference to specific example embodiments, it will be appreciated, that it is intended to cover all modifications and equivalents within the scope of the appended claims.

What is claimed is:

1. A method for recovering heat by means of a heat carrier circulatory system from a fluid passing through different temperature stages, wherein the entrance temperatures of a heat carrier into a preheater and into a cooling device in said circulatory system are changed by means of a heat pumping process, comprising the following steps:
   (a) passing the heat carrier through a discharge air cooling device (5) for heating the heat carrier;
   (b) further passing said heat carrier from said discharge air cooling device (5) through a condenser (10) of a heat pump (13) for further heating said heat carrier,
   (c) passing said further heated heat carrier through a preheater (1) for cooling the heat carrier; and
   (d) further passing the cooled heat carrier from the preheater (1) through a vaporizer (12) of said heat pump for further cooling said heat carrier before returning the heat carrier to said discharge air cooling device (5), whereby the heat carrier is heated twice and cooled twice in a closed circulatory system.

2. The method of claim 1, wherein the entrance temperatures of said heat carrier into said preheater (1) and into said cooling device (5) are changed in a separate circulatory system for the heat carrier by a heat pumping process operating in accordance with the "Lorenz-Principle".

3. The method of claim 1, further comprising adjusting the mass flow of the heat carrier in the circulatory system to the volume of the fluid entering the preheater and the cooling device so that the ratio of the heat carrier mass flow to the fluid from which heat is to be recovered satisfies a predetermined value, for achieving an optimal performance figure for the heat carrier circulatory system.

4. The method of claim 1, further comprising using exhaust heat of a prime mover driving a compression heat pump for reheating the fluid in a reheater upstream of said cooling device through which the fluid is being discharged.

5. The method of claim 1, wherein a cooling heat of a compressed cryogen is transferred to the fluid being heated in an additional heat exchanger separately of transferring a condensation heat of the cryogen in another heat exchanger.

6. The method of claim 1, comprising using as said heat carrier circulatory system a single closed circuit.

* * * * *

UNITED STATES PATENT AND TRADEMARK OFFICE
CERTIFICATE OF CORRECTION

PATENT NO. : 4,510,762
DATED : April 16, 1985
INVENTOR(S) : Fritz Richarts

It is certified that error appears in the above—identified patent and that said Letters Patent is hereby corrected as shown below:

On the title page

[30] Foreign Application Priority Data

Jun. 15, 1982 [DE] Fed. Rep. of Germany .... 3222406 should be deleted.

Signed and Sealed this

Sixteenth Day of July 1985

[SEAL]

Attest:

DONALD J. QUIGG

Attesting Officer     Acting Commissioner of Patents and Trademarks